April 18, 1961  F. E. DAVIS III  2,980,882
METER SOCKET
Filed Sept. 25, 1959
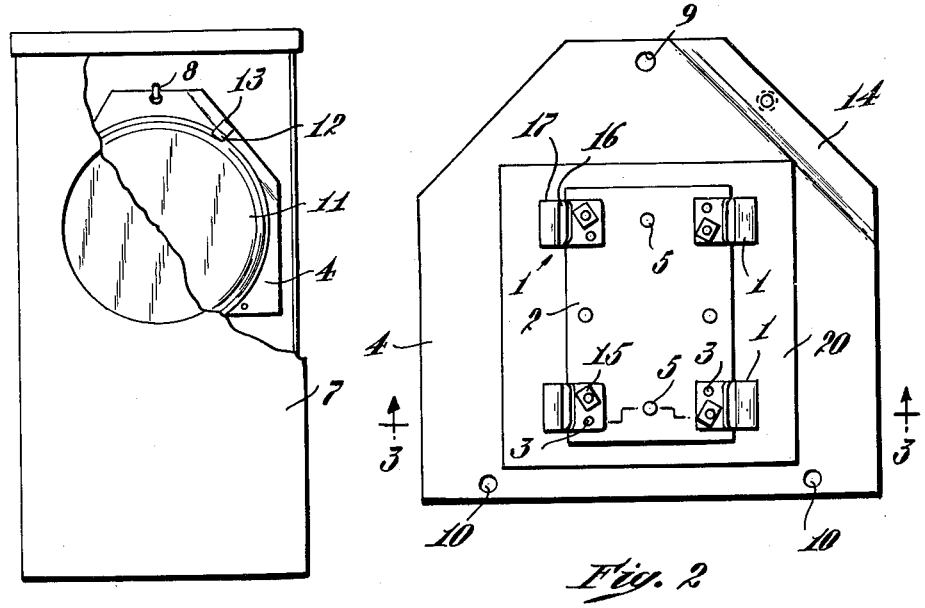
Fig. 1
Fig. 2
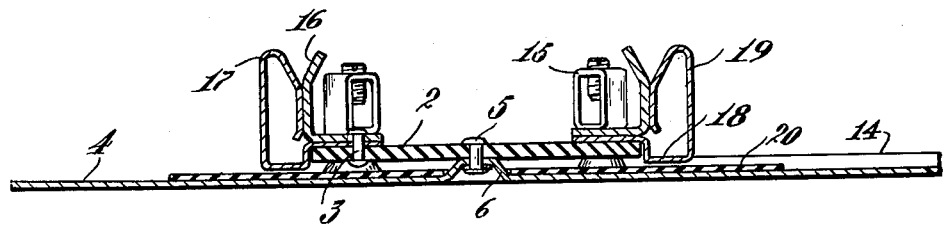
Fig. 3
INVENTOR.
Flavius E. Davis, III
BY
Roberts, Cushman & Grover
ATT'YS

United States Patent Office 2,980,882
Patented Apr. 18, 1961

2,980,882

METER SOCKET

Flavius E. Davis III, Manchester, N.H., assignor, by mesne assignments, to Basic Products Corporation, West Milwaukee, Wis., a corporation of Wisconsin Filed Sept. 25, 1959, Ser. No. 842,476

6 Claims. (Cl. 339—192)

It is often desired to convert existing electrical installations which previously incorporated a bottom connected meter so that they may use the newer plug-in type of meter having blade connectors. One of the problems associated with this conversion is that the enclosures designed for older meters are often too shallow to permit the installation of the newer meter and its associated conventional socket.

It is thus an object of the present invention to provide a very shallow socket for plug-in type meters which will permit the blade contacts to seat in close proximity to the back of the enclosure.

Further objects are to provide such a socket which is of simple and inexpensive manufacture and which can easily be installed in existing enclosures.

Accordingly the present invention contemplates a meter socket wherein jaw-type terminals are attached at the edge of a rigid sheet of insulating material and wherein one jaw of each of said terminals extends outwardly beyond said edge, thence rearwardly to a position in close proximity to the back of the enclosure and then terminates in a forwardly projecting free end, thereby to form a well into which the meter blade may be inserted.

In another aspect the present invention also contemplates a meter socket including jaw-type terminals wherein all connections and attachments to said terminals are made to one side thereof so that the well between the jaws, into which the meter blade seats, may extend almost to the back of the meter enclosure.

In still another aspect a very thin sheet of insulating material underlies the terminals and their support thereby electrically isolating the terminals without appreciably raising them.

A preferred embodiment of the present invention is shown in the accompanying drawing in which—

Fig. 1 is a front elevation of a meter enclosure with meter and socket installed;

Fig. 2 is a plan view of a meter socket; and

Fig. 3 is a section on the line 3—3 of Fig. 2.

Referring now to Fig. 2, jaw-type terminals 1 are fastened to an insulating support board 2 by rivets 3. The support board 2 is in turn fastened to a rigid metallic backing plate 4 by other rivets 5. The rivets 5 may attach to the backing plate 4 at upstanding portions 6 which help to support the support board in spaced relation to the backing plate and which prevent the rivets from projecting beyond the rear surface of the backing plate 4.

The backing plate 4 is adapted to be fastened within an existing enclosure 7 as by a hook 8 engaging the aperture 9 as shown in Fig. 1. Apertures 10 provide alternate means for securely attaching the socket. The meter 11 may be held in place by a clip 12 secured to the backing plate 4 by a screw 13. A raised flange 14 is provided so that the screw 13 will not project beyond the rear surface of the backing plate 4. The clip 12 may also serve to establish a ground connection to the meter case.

The terminals 1 include cable connectors 15, an outwardly facing jaw 16, and an opposing jaw 17. The outwardly facing jaw 16 may be comparatively rigid and extends slightly beyond the edge of the support board 2 (Fig. 3). From its attachment to the support board 2 the opposing jaw 17 extends down below the surface of the support board 2, thus forming a well or recessed portion in which a meter blade may seat in close proximity to the backing plate 4. The free end of the outer jaw is held resiliently against the inner jaw by the upstanding portion 19 which is resilient.

A thin sheet of insulating material 20 underlies the support board 2 and the attached terminals 1 thereby electrically isolating the terminals 1 without appreciably increasing their separation from the backing plate 4. This insulating sheet is held in place by the rivets 5 which secure the support board 2.

It should be understood that the present disclosure is for the purpose of illustration only and that this invention includes all modifications and equivalents which fall within the scope of the appended claims.

I claim:

1. A meter socket comprising front and back sheets of insulating material secured together in superposition, the margin of the back sheet extending beyond the edge of the front sheet, pairs of meter jaws mounted on said sheets, each pair comprising inner and outer jaws having opposing faces on their free ends to contact the opposite sides of a meter blade, said faces being disposed in a plane intersecting said margin of the back sheet beyond said edge of the front sheet, said outer jaw extending outwardly along the front of the front sheet to said edge, thence rearwardly substantially to the back sheet, thence outwardly along said margin, and thence to said free end, whereby the meter blade may be inserted beyond the plane of the front sheet.

2. A meter socket comprising superposed, front and back sheets of insulating material, the margin of the back sheet extending beyond the edge of the front sheet, means for attaching said sheets together with a space therebetween, pairs of meter jaws projecting forwardly from said sheets, fasteners extending through the front sheet for fastening the jaws to the front sheet, the fasteners having heads disposed in said space, each pair of jaws comprising inner and outer jaws having opposing faces on their free ends to contact the opposite sides of a meter blade, said faces being disposed in a plane intersecting said margin of the back sheet beyond said edge of the front sheet, said outer jaw extending outwardly along the front of the front sheet to said edge, thence rearwardly substantially to the back sheet, thence outwardly along said margin, and thence to said free end, whereby the meter blade may be inserted beyond the plane of the front sheet.

3. A meter socket comprising front and back sheets of insulating material secured together in superposition, the margin of the back sheet extending beyond the edge of the front sheet, pairs of meter jaws mounted on said sheets, each pair comprising inner and outer jaws having opposing faces on their free ends to contact the opposite sides of a meter blade, a back panel having bosses extending forwardly through the back sheet to the front sheet with recesses in the rear surface of the panel behind the bosses, and fasteners extending through said bosses with heads disposed in said recesses for attaching said panel to the front sheet, said faces being disposed in a plane intersecting said margin of the back sheet beyond said edge of the front sheet, said outer jaw extending outwardly along the front of the front sheet to said edge, thence rearwardly substantially to the back sheet, thence outwardly along said margin, and thence to said free end, whereby the meter blade may be inserted beyond the plane of the front sheet.

4. For adapting existing meter enclosures to use plug-in type meters, a shallow socket comprising a metal backing plate adapted to be attached to an existing meter enclosure, a rigid support board of insulating material attached to said backing plate, terminal jaws mounted upon said board to receive the blades of a meter, said terminal jaws including a cable connector, an outwardly facing jaw which extends slightly beyond the edge of said support board, and an opposing jaw connected to the support board by a recessed portion extending below the top surface of said support board thereby permitting a meter blade to seat in close proximity to said backing plate and a thin insulating board underlying said support board and the attached terminal jaws.

5. A meter socket according to claim 4 wherein the opposing jaw includes an upstanding resilient portion and, depending from said upstanding portion, a contact.

6. A meter socket according to claim 4 which includes means, attached to the backing plate, for securing a meter thereto.

References Cited in the file of this patent

UNITED STATES PATENTS

| | | |
|---|---|---|
| 1,767,690 | Meuer et al. | June 24, 1930 |
| 1,817,737 | Demonet et al. | Aug. 4, 1931 |
| 2,030,079 | Von Holtz | Feb. 11, 1936 |
| 2,454,803 | Israelski | Nov. 30, 1948 |
| 2,538,912 | Road et al. | Jan. 23, 1951 |
| 2,636,919 | Mensch | Apr. 28, 1953 |